United States Patent [19]

Wagner

[11] 4,406,326

[45] Sep. 27, 1983

[54] PLASTIC WELL SCREEN AND METHOD OF FORMING SAME

[75] Inventor: Walter R. Wagner, Minneapolis, Minn.

[73] Assignee: UOP Inc., Des Plaines, Ill.

[21] Appl. No.: 331,844

[22] Filed: Dec. 17, 1981

[51] Int. Cl.³ .............................................. E21B 43/10
[52] U.S. Cl. ..................................... 166/227; 166/236; 264/DIG. 48; 29/163.5 CW
[58] Field of Search ............ 166/227, 234–236; 210/497.01, 497.2; 428/36; 264/DIG. 48, DIG. 70, 252, 248, 294, 295; 29/163.5 R, 163.5 CW, 163.5 F

[56] References Cited

U.S. PATENT DOCUMENTS

| | | | |
|---|---|---|---|
| 87,385 | 3/1869 | Winchester | 166/227 |
| 1,800,642 | 4/1931 | Johnson | 166/227 |
| 2,046,458 | 7/1936 | Johnson | 210/497.1 |
| 2,933,137 | 4/1960 | D'Audiffret et al. | 166/227 |
| 3,327,865 | 6/1967 | Thompson | 166/227 |
| 4,343,358 | 8/1982 | Gryskiewicz | 166/227 |

Primary Examiner—Stephen J. Novosad
Assistant Examiner—Thuy M. Bui
Attorney, Agent, or Firm—James R. Hoatson, Jr.; Barry L. Clark; William H. Page, II

[57] ABSTRACT

Economical plastic well screens having good hydraulic performance can be produced by the method of the present invention wherein a sheet having a large plurality of V-shaped slots is injection molded, is roll-formed into a cylindrical shape, and then has its longitudinal edges bonded to each other. The resistance of the screen to collapse and tensile forces can be enhanced by the addition of ribs in one or two directions. Also, the sheet can be rolled in one direction or another to vary the slot direction or to permit flow from inside to outside as well as the conventional outside to inside.

6 Claims, 6 Drawing Figures

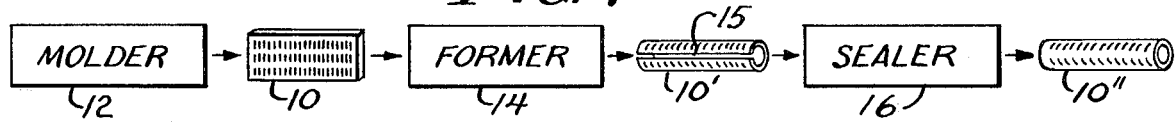
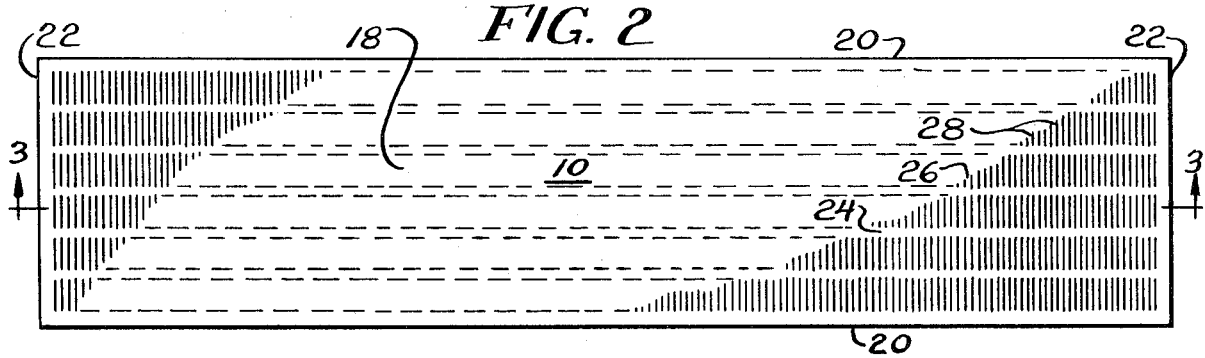
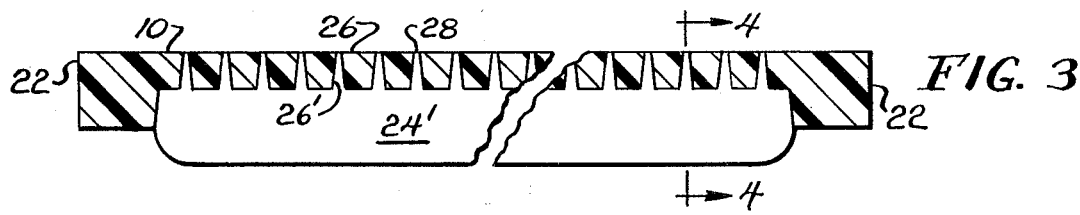
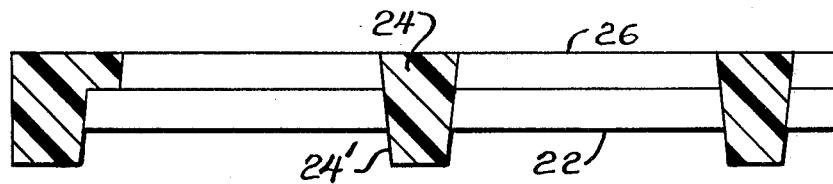
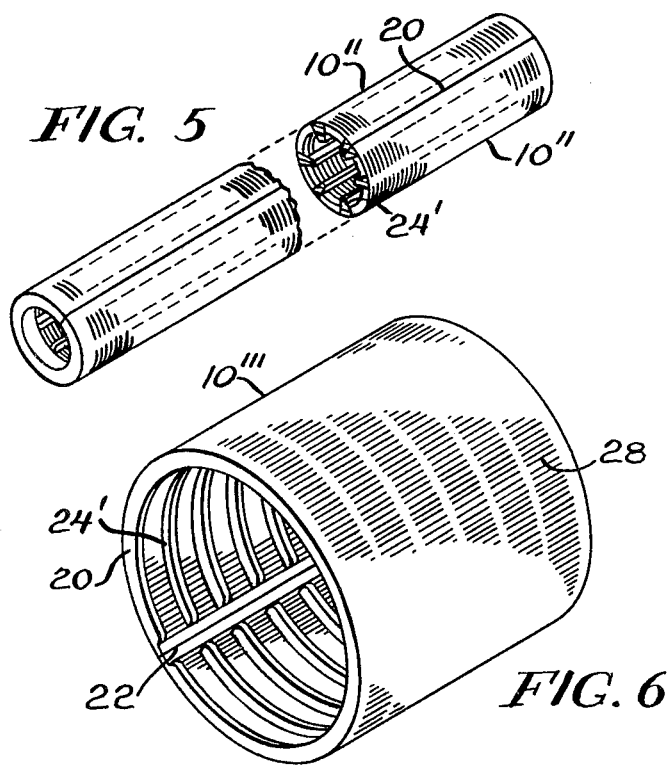

PLASTIC WELL SCREEN AND METHOD OF FORMING SAME

BACKGROUND OF THE INVENTION

The invention relates to well screens, and particularly to plastic well screens which, as compared to screens made of stainless steel, offer advantages of low cost and light weight. In some situations, they can offer superior corrosion resistance. Although it is possible to make a low cost screen by simply slotting the outer surface of a plastic pipe, such a screen which would have an appearance like the screen in U.S. Pat. No. 3,358,781 would not have the resistance to clogging provided by metal or plastic screens having tapered wires welded to longitudinal rods so as to form V-shaped slots. Such slots, which are disclosed in Johnson U.S. Pat. No. 2,046,458, prevent clogging since the slot openings diverge inwardly and release any particles that are small enough to pass through the entrance to the slot openings. U.S. Pat. No. 2,933,137 discloses a plastic pipe where holes and slots are either cut into tubular sections or the pipe is wound on a mandrel having spring biased tapered pins to form the openings. U.S. Pat. No. 3,327,865 discloses several ways of producing screens with tapered openings using a composite of material layers. European Patent Application No. 6830 filed July 3, 1979 shows short lengths of plastic well screen sections which have V-shaped slots. Although formation by molding is noted, there is no showing of how this would be accomplished. Since the element includes axially extending openings for bolts, the mold would be very complicated and expensive. A co-pending application Ser. No. 119,279 filed Feb. 7, 1980 and assigned to a common assignee discloses a plastic screen with V-shaped slots formed by an external laser beam which is focused so as to undercut the surface. The resulting product is quite satisfactory for its purpose, but the laser slotting technique is somewhat slow and expensive.

SUMMARY

It is among the objects of the present invention to provide a method of making a plastic well screen which will overcome the deficiencies of the prior art methods and will enable plastic screens to be made quickly, simply, and economically. These and other objects and advantages are attained by the method of the present invention in which a rectangular screen panel is formed by the molding of a thermoplastic material such as polyvinyl chloride, ABS, polypropylene, or polyethylene. The panel is molded so as to be either flat or slightly curved and so as to include large numbers of slots in its central regions while being unperforated at its edges. The slots have tapered or V-shaped cross-sections so that their smallest dimension is at their entrance surface. The panel is, however, free of slots on its peripheral surfaces. Depending upon the desired direction of flow through the screen and the desired direction of the slots relative to the axis of the screen, the panel is formed preferably by a roll-forming apparatus, into a cylindrical shape. The edges of the panel are then either heat sealed to each other, such as by the use of a hot platen or thermally welded with a hot gas and a filler stick. Certain materials may also be welded with solvent welding techniques where possible leaching out of the solvent will not be a concern. The roll-forming is preferably done with the panel in a warm state. If done immediately after the molding operation, reheating would not be required. To produce screens longer than the panels, the ends of adjacent screen sections can be welded to each other. For additional strength, the slotted panels may have spaced ribs formed on one side during the molding process so as to provide either circumferential or longitudinal support in the final product. Ribs can also be formed in both directions to enhance the resistance of the screen to both collapse forces and tensile forces. When screens which are longer than the molded panel are desired, several cylindrical sections can be bonded together. However, at least in the situation where the sections are provided with longitudinal ribs to increase their tensile strength, it is also desirable to have circumferential ribs or flange portions on each screen at their axial juncture ends to increase the cross-sectional bonding area, and thus the ability to transmit tensile loads.

BRIEF DESCRIPTION OF THE DRAWINGS

FIG. 1 is a schematic diagram of the steps involved in producing a screen;

FIG. 2 is a plan view of a flat molded screen member;

FIG. 3 is a cross-sectional view taken on line 3—3 of FIG. 2;

FIG. 4 is a cross-sectional view taken on line 4—4 of FIG. 3;

FIG. 5 is an isometric view of the screen of FIG. 2 which has been formed so that its screen slots are transverse to its axis; and FIG. 6 is an isometric view of the screen of FIG. 2 which has been formed so that its screen slots are parallel to its axis.

DETAILED DESCRIPTION OF THE PREFERRED EMBODIMENT

FIG. 1 is a schematic representation of the steps required to produce a cylindrical plastic well screen 10″. In molder station 12, which may comprise an injection molding machine, for example, a flat or slightly curved screen panel 10 is produced. The screen panel 10 is then passed through a former station 14 which may include forming guides or rollers similar to those used for forming metal tubing from coiled strip. The panel 10 should be heated to facilitate its forming and can either be formed while still hot from the molding operation or additionally heated. As the formed panel leaves the former station 14, it assumes the shape shown at 10′ wherein its longitudinal seam 15 is unsealed. The panel 10′ is then passed through a sealer station 16 where the seam 15 is closed in any manner desired such as by heat sealing, by the hot air and filler rod method, or by solvent bonding, for example. If desired, the longitudinal sealing step could be accomplished as the last stage of a forming operation in the former station 14. The sealed cylindrical screen 10″ is the product of the aforementioned operations and is shown in more detail in FIG. 5.

One embodiment of a plastic screen 10 produced by the molder 12 is shown in FIGS. 2-4. The screen has a generally rectangular planar surface 18 which has elongated side edge portions 20 and end portions 22. A plurality of spaced longitudinally extending web portions 24 cooperate with spaced transversely extending web portions 26 and the portions 20, 22 to define the surface 18. The openings between adjacent pairs of the web portions 24 and 26 comprise the screen slots 28. The side walls 26′ of the web portions 26 are tapered so that any particles which flow against the surface 18 of the screen which are small enough to get through the slots 28 will not get stuck and "blind" the screen. Since the tapered wall screen slots are easily produced by molding, as are the support ribs 24', it will be appreciated that the screen 10' shown in FIG. 5 which is produced by welding or otherwise sealing the side edge portions 20 to each other, has the slot shape and internal support properties of a wrapped wire plastic screen assembly, but can be produced more economically. Since it is often desirable to have a screen of a length much greater than the length of a single panel 10, which is limited by the size of the molding equipment and dies, the screen is preferably provided with enlarged area end faces 22 which can be bonded to the end faces of other screens.

In FIG. 5, the internal rib portions 24' provide significant column strength to the screen in an axial direction to permit it to resist compression and tensile loads. The FIG. 6 screen 10''' is made by roll-forming the screen 10 into a cylinder in a direction 90° to the direction of rotation used to form screen 10''. In this configuration, the slots 28 also are in a 90° different direction and the ribs 24' provide the screen with a significant degree of hoop strength to resist collapse pressures. If the intended flow direction through the screen is to be outside in, as shown, the screen panel 10 is rolled as shown in FIGS. 5 and 6. Conversely, if flow is to be radially outwardly, the panel 10 would be rolled "inside out" from the manner shown in FIGS. 5 and 6 so that the flow would contact the surface 18 and so that particles could not blind the slots 28.

I claim as my invention:

1. A method of forming a cylindrical plastic well screen having V-shaped slots comprising the steps of integrally molding a quantity of thermoplastic material into the form of a sheet having a continuous peripheral edge portion and a large plurality of closely spaced elongated slot-like openings inwardly of the peripheral edge portion which have a uniform width and a generally V-shaped cross-section; forming the molded sheet into a cylindrical shape so that the slot cross-section increases in the direction of flow and bonding the longitudinal edges of the sheet to each other.

2. The method of claim 1 wherein said sheet is molded so as to be generally smooth on one side and ribbed on the other, with the ribs being located in a direction transverse to the direction of the elongated slots, the sheet being molded so as to be thinner in its slotted area than in its ribbed area and its peripheral edge areas.

3. A cylindrical thermoplastic well screen formed from a unitary molded sheet having flanged side edges and comprising a single, radially inwardly extending, longitudinal seam portion thereon wherein said opposed flanged edges of the molded sheet are bonded together, said unitary molded sheet from which said well screen is made having one of its inner and outer surfaces smooth and the other ribbed and having a plurality of integrally molded screen slots therein which are oriented after forming so as to extend between said surfaces and are spaced from each other in both a longitudinal and circumferential direction, said screen slots being tapered in a radial direction so that they are of increasing width in the direction that extends from the smooth surface to the ribbed surface.

4. The thermoplastic well screen of claim 1 wherein said well screen has a plurality of ribs formed on its ribbed surface which extend longitudinally of the axis of the cylinder, said slots being positioned transversely of said ribs.

5. The thermoplastic well screen of claim 1 wherein the end surfaces of said well screen are of annular shape and of a greater radial dimension than the aforesaid slots.

6. The thermoplastic well screen of claim 1 wherein said well screen has a plurality of ribs formed on its ribbed surface which extend circumferentially of the cylinder, said slots being positioned in the axial direction of said cylinder.

* * * * *